US010627598B2

(12) United States Patent
Matsubara (10) Patent No.: US 10,627,598 B2
(45) Date of Patent: Apr. 21, 2020

(54) OBSERVATION DEVICE, OBSERVATION METHOD, AND OBSERVATION DEVICE CONTROL PROGRAM (71) Applicant: FUJIFILM Corporation, Tokyo (JP)

(72) Inventor: Kenta Matsubara, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 16/291,683

(22) Filed: Mar. 4, 2019

(65) Prior Publication Data
US 2019/0204536 A1 Jul. 4, 2019

Related U.S. Application Data (63) Continuation of application No. PCT/JP2017/031760, filed on Sep. 4, 2017.

(30) Foreign Application Priority Data

Sep. 30, 2016 (JP) .................................. 2016-192770

(51) Int. Cl.
G02B 7/36 (2006.01)
G02B 21/00 (2006.01)
(Continued)

(52) U.S. Cl.
CPC ............. *G02B 7/36* (2013.01); *G02B 21/006* (2013.01); *G02B 21/0036* (2013.01);
(Continued)

(58) Field of Classification Search
CPC ........ G02B 7/28; G02B 7/36; G02B 21/0036; G02B 21/006; G02B 21/244; G02B 21/26; G02B 21/367
See application file for complete search history.

(56) References Cited

U.S. PATENT DOCUMENTS

2002/0089740 A1* 7/2002 Wetzel .................. G01B 7/003
359/385
2009/0010807 A1 1/2009 Yokoyama et al.
(Continued)

FOREIGN PATENT DOCUMENTS

CN 103852878 A 6/2014
JP 2003295065 A 10/2003
(Continued)

OTHER PUBLICATIONS

Communication dated Sep. 20, 2019 from the European Patent Office in application No. EP17855593.4.
(Continued)

Primary Examiner — Lin Ye
Assistant Examiner — Chriss S Yoder, III
(74) Attorney, Agent, or Firm — Sughrue Mion, PLLC (57) ABSTRACT At least one of a stage on which a cultivation container 50 that contains a plurality of wells 52 is placed or an imaging optical system that includes an objective lens for forming an image of the observation target in each well 52 is moved to scan an observation position in the stage, to thereby observe the observation target. In a case where the objective lens is moved in an optical axis direction to perform an auto-focus control at each observation position, a start timing of the auto-focus control at each observation position D is changed on the basis of a boundary portion between respective wells 52 that are adjacent to each other in a scanning direction of the observation positions.

20 Claims, 6 Drawing Sheets (51) Int. Cl.
  *G02B 21/24* (2006.01)
  *G02B 21/36* (2006.01)
  *G02B 21/26* (2006.01)
(52) U.S. Cl.
  CPC ......... *G02B 21/244* (2013.01); *G02B 21/367* (2013.01); *G02B 21/26* (2013.01)

(56) References Cited

U.S. PATENT DOCUMENTS

| | | | |
|---|---|---|---|
| 2009/0226061 A1* | 9/2009 | Maiya | G02B 21/367 382/128 |
| 2012/0120302 A1 | 5/2012 | Kiyota et al. | |
| 2014/0210981 A1 | 7/2014 | Stauffer | |

FOREIGN PATENT DOCUMENTS

| | | |
|---|---|---|
| JP | 2005-284118 A | 10/2005 |
| JP | 2008-292216 A | 12/2008 |
| JP | 2009-025349 A | 2/2009 |
| JP | 2009-198525 A | 9/2009 |
| JP | 2009-222588 A | 10/2009 |
| JP | 2010-072017 A | 4/2010 |
| WO | 2010/128670 A1 | 11/2010 |
| WO | 2013023017 A1 | 2/2013 |

OTHER PUBLICATIONS

International Search Report dated Oct. 31, 2017 from the International Searching Authority in counterpart International Application No. PCT/JP2017/031760.
International Preliminary Report on Patentability dated Apr. 2, 2019 from the International Bureau in counterpart International Application No. PCT/JP2017/031760.
Written Opinion dated Oct. 31, 2017 from the International Bureau in counterpart International Application No. PCT/JP2017/031760.

* cited by examiner

OBSERVATION DEVICE, OBSERVATION METHOD, AND OBSERVATION DEVICE CONTROL PROGRAM

CROSS REFERENCE TO RELATED APPLICATIONS

This application is a Continuation of PCT International Application No. PCT/JP2017/031760 filed on Sep. 4, 2017, which claims priority under 35 U.S.C § 119(a) to Patent Application No. 2016-192770 filed in Japan on Sep. 30, 2016, all of which are hereby expressly incorporated by reference into the present application.

BACKGROUND OF THE INVENTION

1. Field of the Invention

The present invention relates to an observation device, an observation method, and a program for observing an entire image of an observation target by moving a stage on which a container in which the observation target is contained is placed with respect to an imaging optical system that forms an image of the observation target.

2. Description of the Related Art

In the related art, a method for capturing an image of a multipotential stem cell such as an embryonic stem (ES) cell or an induced pluripotent stem (iPS) cell, a differentiated and induced cell, or the like using a microscope or the like, and capturing a feature of the image to decide a differentiation state of the cell, or the like has been proposed.

The multipotential stem cell such as an ES cell or an iPS cell is able to be differentiated into cells of various tissues, and may be applied to regenerative medicine, development of medicines, explanation of diseases, or the like.

On the other hand, in a case where a cell is imaged using a microscope as described above, in order to acquire a high-magnification wide view image, for example, a so-called tiling imaging technique has been proposed. Specifically, for example, the inside of a range of a cultivation container such as a well plate is scanned using an imaging optical system and an image at each observation position is captured, and then, the images at the respective observation positions are combined.

Further, in a case where the tiling imaging technique is used, a method for obtaining a high-quality image with little blur by performing an auto-focus control at each observation position in the cultivation container has been proposed (see JP2010-072017A, JP2008-292216A, and JP2009-025349A).

SUMMARY OF THE INVENTION

Here, in a case where an auto-focus control is performed in the tiling imaging as described above, it is important to perform the auto-focus control with high speed and high accuracy in a viewpoint of reduction of an imaging time.

However, for example, in a case where a well plate that includes a plurality of wells is used as a cultivation container, the entire well plate is scanned by an imaging optical system, tiling imaging is performed while performing the auto-focus control with respect to each observation position, the thickness of a bottom portion of each well is changed for each well due to an error in manufacturing, or the like.

Accordingly, for example, in a case where a position of a bottom surface (observation target installation surface) of a well is detected to perform an auto-focus control, in a case where the thickness of a bottom portion is greatly changed between adjacent wells, since the position of the bottom surface of the well is greatly changed, it takes a long time for the auto-focus control, which leads to a problem that an imaging time becomes long.

In consideration of the above-mentioned problems, an object of the present invention is to provide an observation device, an observation method, and a non-transitory computer recording medium storing an observation device control program capable of efficiently performing an auto-focus control to reduce an imaging time.

According to an embodiment of the invention, there is provided an observation device comprising: a stage on which a plurality of containers in which an observation target is contained are placed; an imaging optical system that includes an objective lens for forming an image of the observation target in each container; a horizontal driving section that moves at least one of the stage or the imaging optical system in a horizontal plane; a scanning controller that controls the horizontal driving section to move at least one of the stage or the imaging optical system, to scan an observation position in the stage; an imaging optical system driving section that moves the objective lens in an optical axis direction; and an auto-focus controller that controls the imaging optical system driving section to perform an auto-focus control at each observation position, in which the auto-focus controller changes a start timing of the auto-focus control at each observation position on the basis of a boundary portion between the containers that are adjacent to each other in a scanning direction of the observation positions.

Further, in the observation device according to the embodiment of the invention, the auto-focus controller may start the auto-focus control at an observation position just behind the boundary portion after a time point when the auto-focus control at an observation position just in front of the boundary portion is terminated and before the imaging optical system reaches the observation position just behind the boundary portion.

Further, in the observation device according to the embodiment of the invention, the auto-focus controller may start the auto-focus control at a different observation position other than the observation position just behind the boundary portion from a time point when the imaging optical system reaches the different observation position.

Further, in the observation device according to the embodiment of the invention, it is preferable that a period of time for the auto-focus control at the observation position just behind the boundary portion is longer than a period of time for the auto-focus control at the different observation position other than the observation position just behind the boundary portion.

Further, the observation device according to the embodiment of the invention may further comprise a detection section that precedently detects a vertical position of the container placed on the stage at the observation position before the imaging optical system reaches the observation position, in which the auto-focus controller performs the auto-focus control at the observation position on the basis of a detection signal of the detection section.

Further, in the observation device according to the embodiment of the invention, the detection section may include at least two displacement sensors that are disposed side by side in the scanning direction with the objective lens being interposed therebetween, and the displacement sensor to be used is changed in accordance with a direction change of the scanning direction.

Further, in the observation device according to the embodiment of the invention, the detection section may detect the boundary portion between the containers.

Further, in the observation device according to the embodiment of the invention, in a case where the detection signal detected by the detection section is abnormal, the auto-focus controller may perform the auto-focus control with respect to the observation position where the abnormal detection signal is detected, on the basis of detection signals of the detection section at observation positions before and after an observation position where the abnormal detection signal is detected in the scanning direction.

Further, the observation device according to the embodiment of the invention may further comprise a storage section that stores positional information of the boundary portion between the containers, in which the auto-focus controller changes the start timing of the auto-focus control on the basis of the positional information of the boundary portion stored in the storage section.

In the observation device according to the embodiment of the invention, the container may be each well of a well plate.

According to another embodiment of the invention, there is provided an observation method for moving at least one of a stage on which a plurality of containers in which an observation target is contained are placed or an imaging optical system that includes an objective lens for forming an image of the observation target in each container to scan an observation position in the stage to observe the observation target, the method comprising: changing, in a case where the objective lens is moved in an optical axis direction to perform an auto-focus control at each observation position, a start timing of the auto-focus control at each observation position on the basis of a boundary portion between the containers that are adjacent to each other in a scanning direction of the observation positions.

According to still another embodiment of the invention, there is provided a non-transitory computer recording medium storing an observation device control program that causes a computer to execute: a step of moving at least one of a stage on which a plurality of containers in which an observation target is contained are placed or an imaging optical system that includes an objective lens for forming an image of the observation target in each container to scan an observation position in the stage; a step of moving the objective lens in an optical axis direction to perform an auto-focus control at each observation position; and a step of changing a start timing of the auto-focus control at each observation position on the basis of a boundary portion between respective containers that are adjacent to each other in a scanning direction of the observation positions.

According to the observation device, the observation method, and the non-transitory computer recording medium storing the observation device control program of the invention, by moving at least one of a stage on which a plurality of containers in which an observation target is contained are placed or an imaging optical system that includes an objective lens for forming an image of the observation target in each container, an observation position in the stage is scanned to thereby observe the observation target. Further, by moving the objective lens in an optical axis direction, when performing an auto-focus control at each observation position, a start timing of the auto-focus control at each observation position is changed on the basis of a boundary portion between respective containers that are adjacent to each other in a scanning direction of the observation positions. Thus, it is possible to efficiently perform the auto-focus control, and to shorten an imaging time.

DESCRIPTION OF THE PREFERRED EMBODIMENTS

Figure 1:
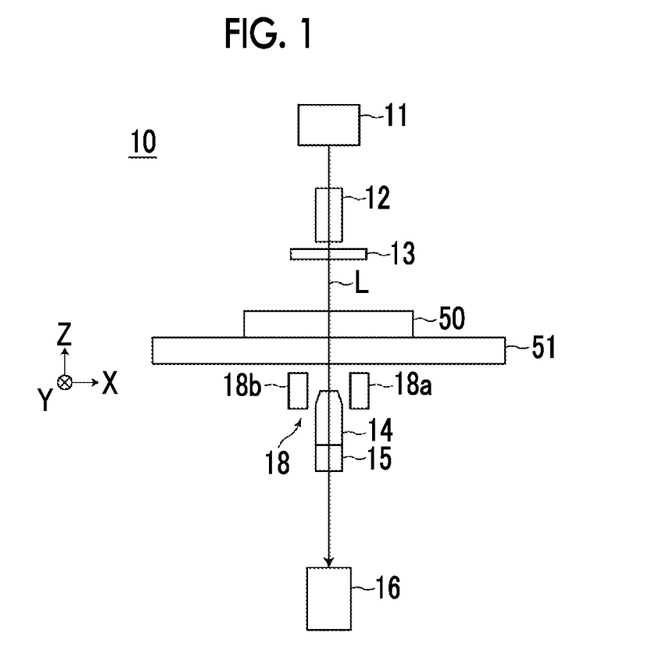
FIG. 1 is a diagram showing a schematic configuration of a microscope device in a microscope observation system that uses an observation device according to an embodiment of the present invention.

Hereinafter, a microscope observation system that uses an observation device and an observation method according to an embodiment of the invention will be described in detail with reference to the accompanying drawings. FIG. 1 is a diagram showing a schematic configuration of a microscope device 10 in the microscope observation system of the embodiment.

The microscope device 10 captures a phase difference image of a cultivated cell that is an observation target. Specifically, the microscope device 10 includes a white light source 11 that emits white light, a condenser lens 12, a slit plate 13, an imaging optical system 14, an imaging optical system driving section 15, an imaging element 16, and a detection section 18, as shown in FIG. 1.

Further, a stage 51 is provided between the slit plate 13, and the imaging optical system 14 and the detection section 18. A cultivation container 50 in which cells that are observation targets are contained is placed on the stage 51.

Figure 2:
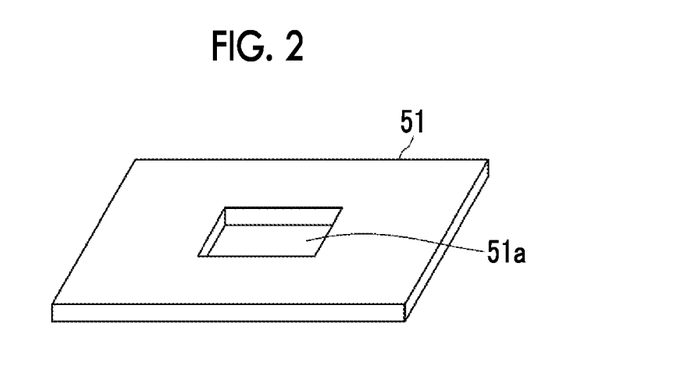
FIG. 2 is a perspective view showing a configuration of a stage.

FIG. 2 is a diagram showing an example of the stage 51. At the center of the stage 51, a rectangular opening 51a is formed. The cultivation container 50 is provided on a member that is formed with the opening 51a, and in this configuration, a phase difference image of a cell in the cultivation container 50 passes through the opening 51a.

In the embodiment, as the cultivation container 50, a well plate that includes a plurality of wells (in which one well corresponds to a container of the invention) in which cells are contained is used. Further, as the cells contained in the cultivation container 50, multipotential stem cells such as induced pluripotent stem (iPS) cells and embryonic stem (ES) cells, cells of nerves, the skin, the myocardium and the liver, which are differentiated and induced from a stem cell, cells of the skin, the retina, the myocardium, blood corpuscles, nerves, and organs extracted from a human body, and the like, may be used.

Figure 7:
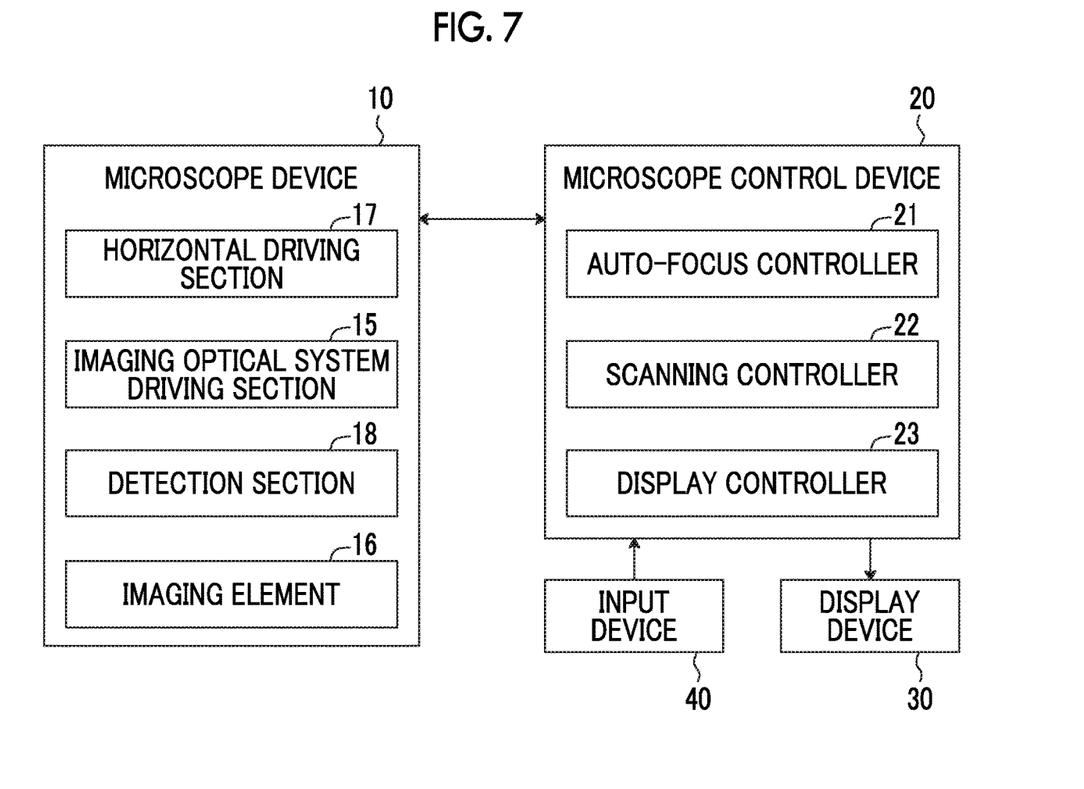
FIG. 7 is a block diagram showing a schematic configuration of the microscope observation system that uses the observation device according to the embodiment of the invention.

The stage 51 is configured to be moved in an X direction and a Y direction that are orthogonal to each other by a horizontal driving section 17 (see FIG. 7). The X direction and the Y direction are directions that are orthogonal to a Z direction, and are directions that are orthogonal to each other in a horizontal plane.

The slit plate 13 has a configuration in which a ring-shaped slit through which white light passes is formed in a light-shielding plate that shields white light emitted from the white light source 11. As the white light passes through the slit, ring-shaped illumination light L is formed.

Figure 3:
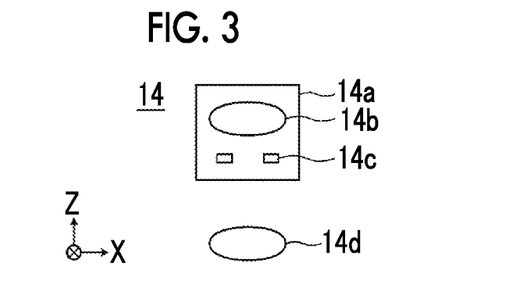
FIG. 3 is a schematic diagram showing a configuration of an imaging optical system.

FIG. 3 is a diagram showing a detailed configuration of the imaging optical system 14. The imaging optical system 14 includes a phase difference lens 14a and an imaging lens 14d, as shown in FIG. 3. The phase difference lens 14a includes an objective lens 14b and a phase plate 14c. The phase plate 14c has a configuration in which a phase ring is formed in a transparent plate that is transparent with respect to a wavelength of the illumination light L. The size of the slit of the above-described slit plate 13 is in a cooperative relation with the phase ring of the phase plate 14c.

The phase ring has a configuration in which a phase membrane that shifts a phase of incident light by ¼ of a wavelength and a dimmer filter that dims incident light are formed in a ring shape. The phase of direct light incident onto the phase ring shifts by ¼ of a wavelength after passing through the phase ring, and its brightness is weakened. On the other hand, most of diffracted light diffracted by an observation target passes through the transparent plate of the phase plate 14c, and its phase and brightness are not changed.

The phase difference lens 14a having the objective lens 14b is moved in an optical axis direction of the objective lens 14b by the imaging optical system driving section 15 shown in FIG. 1. In this embodiment, the objective lens 14b, the optical axis direction, and a Z direction (vertical direction) are the same direction. An auto-focus control is performed as the phase difference lens 14a is moved in the Z direction, and contrast of a phase difference image captured by the imaging element 16 is adjusted.

Further, a configuration in which a magnification of the phase difference lens 14a is changeable may be used. Specifically, a configuration in which the phase difference lenses 14a or the imaging optical systems 14 having different magnifications are interchangeable may be used. The interchange between the phase difference lens 14a and the imaging optical systems 14 may be automatically performed, or may be manually performed by a user.

The imaging optical system driving section 15 includes an actuator such as a piezoelectric element, for example, and performs driving on the basis of a control signal output from an auto-focus controller 21 (which will be described later). The imaging optical system driving section 15 is configured to pass a phase difference image passed through the phase difference lens 14a as it is. Further, the configuration of the imaging optical system driving section 15 is not limited to the piezoelectric element. A configuration in which the phase difference lens 14a is movable in the Z direction may be used, and known different configurations may be used.

The imaging lens 14d receives a phase difference image passed through the phase difference lens 14a and the imaging optical system driving section 15 and incident thereto, and causes an image based on the phase difference image to be formed on the imaging element 16.

The imaging element 16 captures an image on the basis of the phase difference image formed by the imaging lens 14d. As the imaging element 16, a charge-coupled device (CCD) image sensor, a complementary metal-oxide semiconductor (CMOS) image sensor, or the like may be used. As the imaging element, an imaging element in which color filters of red, green, and blue (R, G, and B) are provided may be used, or a monochromic imaging element may be used.

The detection section 18 detects a Z-directional (vertical) position in the cultivation container 50 placed on the stage 51. Specifically, the detection section 18 includes a first auto-focus displacement sensor 18a and a second auto-focus displacement sensor 18b. The first and second auto-focus displacement sensors 18a and 18b correspond to displacement sensors of the invention.

The first auto-focus displacement sensor 18a and the second auto-focus displacement sensor 18b are provided side by side in the X direction as shown in FIG. 1 with the imaging optical system 14 (objective lens 14b) being interposed therebetween. The first auto-focus displacement sensor 18a and the second auto-focus displacement sensor 18b in this embodiment are laser displacement meters, which irradiate the cultivation container 50 with laser light and detect its reflection light to detect a Z-directional position of a bottom surface of the cultivation container 50. The bottom surface of the cultivation container 50 refers to a boundary surface between a bottom portion of the cultivation container 50 and cells that are observation targets, that is, a surface on which the observation targets are placed.

Information on the Z-directional position of the cultivation container 50 detected by the detection section 18 is output to the auto-focus controller 21, and the auto-focus controller 21 controls the imaging optical system driving section 15 on the basis of the input positional information to perform the auto-focus control.

More specifically, in the microscope device 10 according to the embodiment, before the imaging optical system 14 reaches a predetermined observation position in the cultivation container 50 on the stage 51, the information on the Z-directional position of the cultivation container 50 at the observation position is precedently detected by the first or second auto-focus displacement sensor 18a or 18b, and when the imaging optical system 14 reaches the observation position, the imaging optical system driving section 15 is controlled on the basis of the positional information detected by the first or second auto-focus displacement sensor 18a or 18b to perform the auto-focus control.

Here, in a case where a well plate that includes a plurality of wells is used as the cultivation container 50 as in the embodiment, if an auto-focus control is performed with respect to all observation positions on the well plate from a time point when the imaging optical system 14 reaches each observation position as in the related art, in performing an auto-focus control at an observation position just behind a boundary portion between wells that are adjacent to each other in a scanning direction of the observation positions, that is, a first observation position of a well placed on a frontward side in the scanning direction among the adjacent wells, it takes a long time for the auto-focus control due to a difference between thicknesses of bottom portions for the respective wells. Here, the above-described scanning direction of the observation positions refers to a direction that is opposite to the movement direction of the stage 51.

Figure 4:
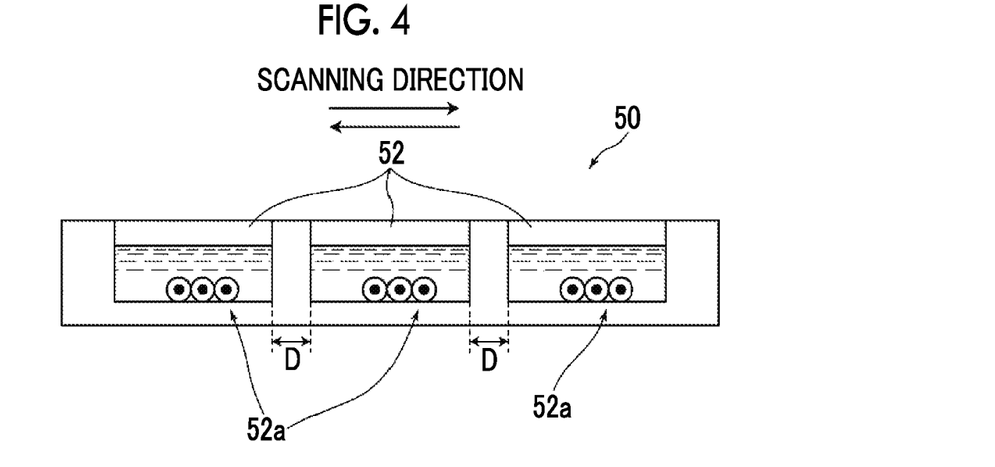
FIG. 4 is a diagram illustrating a boundary portion between respective wells of a well plate.

FIG. 4 is a cross-sectional schematic diagram of an example of the cultivation container 50 (well plate) that includes a plurality of wells 52. Here, "D" shown in FIG. 4 represents a boundary portion between adjacent wells, and "52a" represents a bottom portion of the well 52. As shown in FIG. 4, the thickness of the bottom portion 52a of each well 52 is changed in accordance with variations in manufacturing.

Further, in performing scanning in a two-dimensional manner while reciprocating the stage 51 in the X direction and in the Y direction, since the stage 51 passes through the boundary between the wells 52 several times, a time loss for the auto-focus control in passing over the above-described boundary portion D between the wells 52 becomes large.

Figure 5:
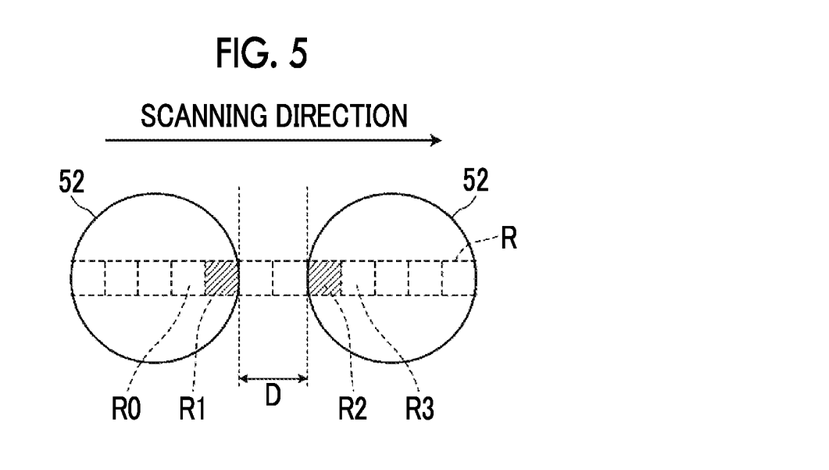
FIG. 5 is a diagram illustrating an auto-focus control in the microscope observation system that uses the observation device according to the embodiment of the invention.

Accordingly, in this embodiment, as shown in FIG. 5, between an observation position R2 just behind the boundary portion D of the adjacent wells 52 and an observation position other than the observation position R2 just behind the boundary portion D, a start timing for the auto-focus control is changed. Specifically, in this embodiment, the auto-focus control at the observation position R2 just behind the boundary portion D is started from a time point when an auto-focus control at an observation position R1 just in front of the boundary portion D is terminated. Rectangular ranges indicated by dashed lines shown in FIG. 5 represent respective observation positions R.

Figure 6:
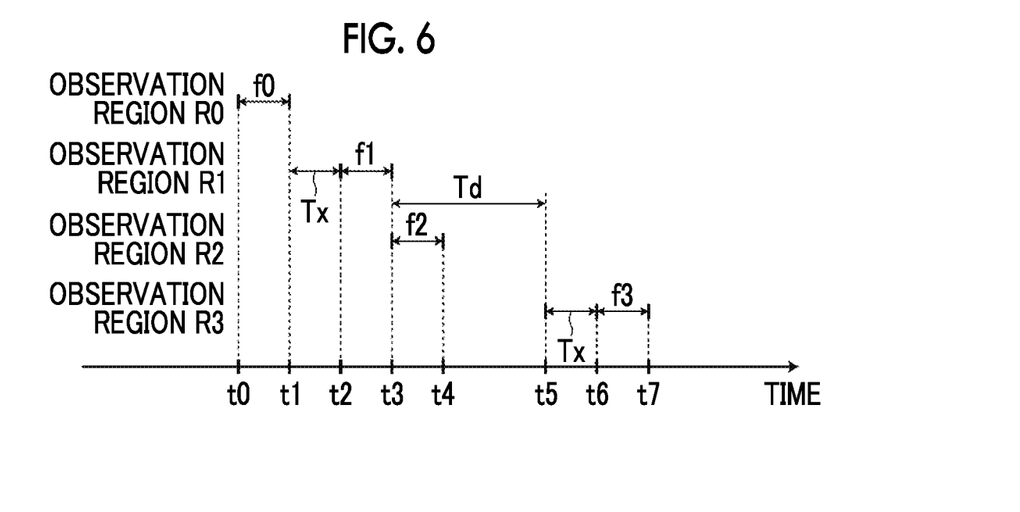
FIG. 6 is a diagram illustrating an example of a start timing of the auto-focus control according to the embodiment of the invention.

That is, in this embodiment, since it is not necessary to perform imaging based on an auto-focus control with respect to observation positions included in the boundary portion D between the adjacent wells 52, the auto-focus control is not performed with respect to the observation positions included in the boundary portion D, and the auto-focus control of the observation position R2 just behind the boundary portion D is performed using a scanning time at the observation positions included in the boundary portion D. FIG. 6 is a diagram showing an example of a start timing of an auto-focus control at observation positions R0 to R3 adjacent to the boundary portion D between the wells 52 and end timings thereof. In FIG. 6, f0 to f3 represent periods of time when the auto-focus control at the respective observation positions R0 to R3 is performed. Tx represents a scanning time between adjacent observation positions (a period of time when the imaging optical system 14 is relatively moved with respect to the stage 51), and Td represents a scanning time from the observation position R2 to the observation position R3.

As shown in FIG. 6, with respect to the observation position R0, the auto-focus control is started from a time point t0, and the auto-focus control is terminated at a time point t1. Further, after scanning is performed from the observation position R0 to the observation position R1, the auto-focus control at the observation position R1 is started from a time point t2, and the auto-focus control is terminated at a time point t3. In addition, the auto-focus control at the observation position R2 is started from the time point t3 when the auto-focus control at the observation position R1 is terminated, and the auto-focus control at the observation position R3 is terminated at a time point t4 before a time point t5 when the imaging optical system 14 reaches the observation position R2. That is, the auto-focus control at the observation position R2 is terminated within a scanning time Td from the observation position R1 to the observation position R2.

Further, at the time point t5 when the imaging optical system 14 reaches the observation position R2, since the auto-focus control at the observation position R2 is already terminated, imaging for a phase difference image at the observation position R2 is immediately performed, and the scanning proceeds toward the next observation position R3. Further, after the scanning is performed from the observation position R2 to the observation position R3, the auto-focus control at the observation position R3 is started from a time point t6, and the auto-focus control is terminated at a time point t7.

In the case of the related-art auto-focus control, since the auto-focus control at the observation position R2 is started from a time point when the imaging optical system 14 reaches the observation position R2 (the time point t5 in FIG. 6), an imaging time becomes large. Particularly, in a case where the thicknesses of the bottom portion of the well 52 are different from each other, its time loss becomes large.

In this embodiment, as described above, by setting early a start timing of the auto-focus control at the observation position R2 just behind the boundary portion D, it is possible to shorten the imaging time.

With respect to an observation position other than the observation position R2 just behind the boundary portion D, as described above, the auto-focus control is started from a time point when the imaging optical system 14 reaches the observation position. Further, in this embodiment, the auto-focus control at the observation position R2 just behind the boundary portion D is started from the end time point t3 of the auto-focus control at the observation position R1 just in front of the boundary portion D, but the invention is not limited thereto. The auto-focus control at the observation position R2 just behind the boundary portion D may be started from any time point as long as the time point is between the time point t3 when the auto-focus control at the observation position R1 is ended and the time point t5 when the imaging optical system 14 reaches the observation position R2. That is, the auto-focus control at the observation position R2 just behind the boundary portion D may be started from any other time point within the period of time Td shown in FIG. 6.

Further, in this embodiment, a period of time for the auto-focus control at the observation position R2 just behind the boundary portion D (for example, the period of time Td shown in FIG. 6, which is a period of time until the imaging optical system 14 reaches the observation position R2 from the observation position R1) is set to be longer than a period of time for the auto-focus control at an observation position other than the observation position R2 just behind the boundary portion D (for example, a period of time from the time point t0 to the time point t2 shown in FIG. 6, which is a period of time from a time point when the imaging optical system 14 reaches the observation position R0 to a time point when the imaging optical system 14 reaches the observation position R1).

Further, in a case where the auto-focus control at the observation position R2 just behind the boundary portion D is performed as described above, it is necessary to specify coordinate positions in an X-Y plane of the observation position R1 just in front of the boundary portion D and the observation position R2 just behind the boundary portion D.

That is, it is necessary to specify the boundary portion D. Accordingly, in this embodiment, the boundary portion D between the adjacent wells 52 is detected by the first or second auto-focus displacement sensor 18a or 18b as described above. Specifically, in the boundary portion D, since there is no bottom surface of the well 52, obviously, a detection signal detected by the first or second auto-focus displacement sensor 18a or 18b becomes different. Accordingly, for example, by determining whether the detection signal detected by the first or second auto-focus displacement sensor 18a or 18b is within a range of a predetermined threshold value, it is possible to detect the boundary portion D.

Next, a configuration of a microscope control device 20 that controls the microscope device 10 will be described. FIG. 7 is a block diagram showing a configuration of the microscope observation system according to the embodiment of the invention. With respect to the microscope device 10, a block diagram of a partial configuration controlled by respective sections of the microscope control device 20 is shown.

The microscope control device 20 generally controls the microscope device 10, and particularly, includes an auto-focus controller 21, a scanning controller 22, and a display controller 23.

The microscope control device 20 is configured of a computer including a central processing unit, a semiconductor memory, a hard disk, and the like. An embodiment of an observation device control program of the invention is installed in the hard disk. Further, as the observation device control program is executed by a central processing unit such as a central processing unit (CPU), the auto-focus controller 21, the scanning controller 22, and the display controller 23 shown in FIG. 7 execute their functions.

The auto-focus controller 21 controls the imaging optical system driving section 15 on the basis of the Z-directional position information of the cultivation container 50 detected by the detection section 18 as described above. Further, the objective lens 14b of the imaging optical system 14 is moved in the optical axis direction by driving of the imaging optical system driving section 15, so that the auto-focus control is performed.

Further, the auto-focus controller 21 according to this embodiment changes a start timing for an auto-focus control between an observation position just behind a boundary portion between adjacent wells and an observation position other than the observation position just behind the boundary portion.

The scanning controller 22 controls driving of the horizontal driving section 17, so that the stage 51 is moved in the X direction and the Y direction. The horizontal driving section 17 is configured of an actuator having a piezoelectric element, or the like.

Figure 8:
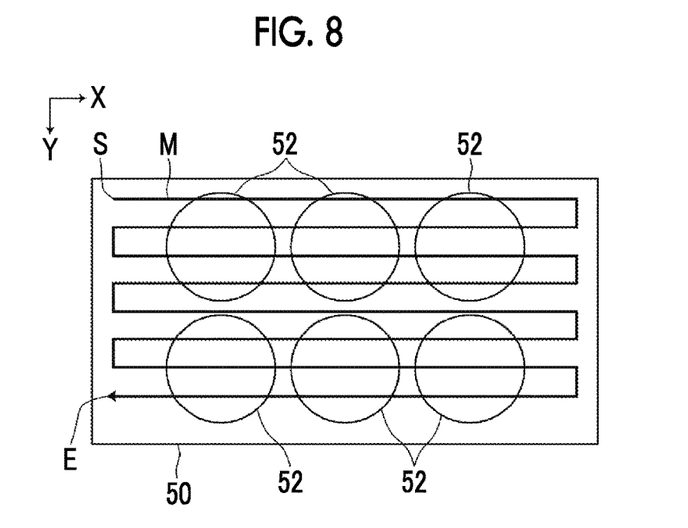
FIG. 8 is a diagram showing a scanning position at an observation position in a cultivation container.

In this embodiment, as described above, the stage 51 is moved in the X direction and the Y direction under the control of the main scanning controller 22, the observation position in the cultivation container 50 is scanned in a two-dimensional manner, and a phase difference image at each observation position is captured. FIG. 8 is a diagram showing a scanning position at an observation position in the cultivation container 50 using a solid line M. In this embodiment, a well plate having six wells 52 is used as the cultivation container 50.

As shown in FIG. 8, in the cultivation container 50, the observation position is scanned from a scanning start point S to a scanning end point E along the solid line M, in accordance with the movement of the stage 51 in the X direction and the Y direction. That is, the observation position is scanned in a positive direction (a rightward direction in FIG. 8) of the X direction, is scanned in the Y direction (a downward direction in FIG. 8), and then, is scanned in a reverse negative direction (in a leftward direction in FIG. 8). Then, the observation position is scanned in the Y direction again, and then, is scanned in the positive direction of the X direction again. In this way, by repeating the reciprocation in the X direction and the movement in the Y direction of the stage 51, the observation position is scanned in the cultivation container 50 in a two-dimensional manner.

Next, returning to FIG. 7, the display controller 23 combines phase difference images at the respective observation positions imaged by the microscope device 10 to generate one synthetic phase difference image, and displays the synthetic phase difference image on the display device 30.

The display device 30 displays the synthetic phase difference image generated by the display controller 23 as described above. For example, the display device 30 includes a liquid crystal display, or the like. Further, the display device 30 may be formed by a touch panel, and may also be used as the input device 40.

The input device 40 includes a mouse, a keyboard, or the like, and receives various setting inputs from a user. The input device 40 according to this embodiment receives a setting input such as a change command of the magnification of the phase difference lens 14a or a change command of the moving velocity of the stage, for example.

Figure 9:
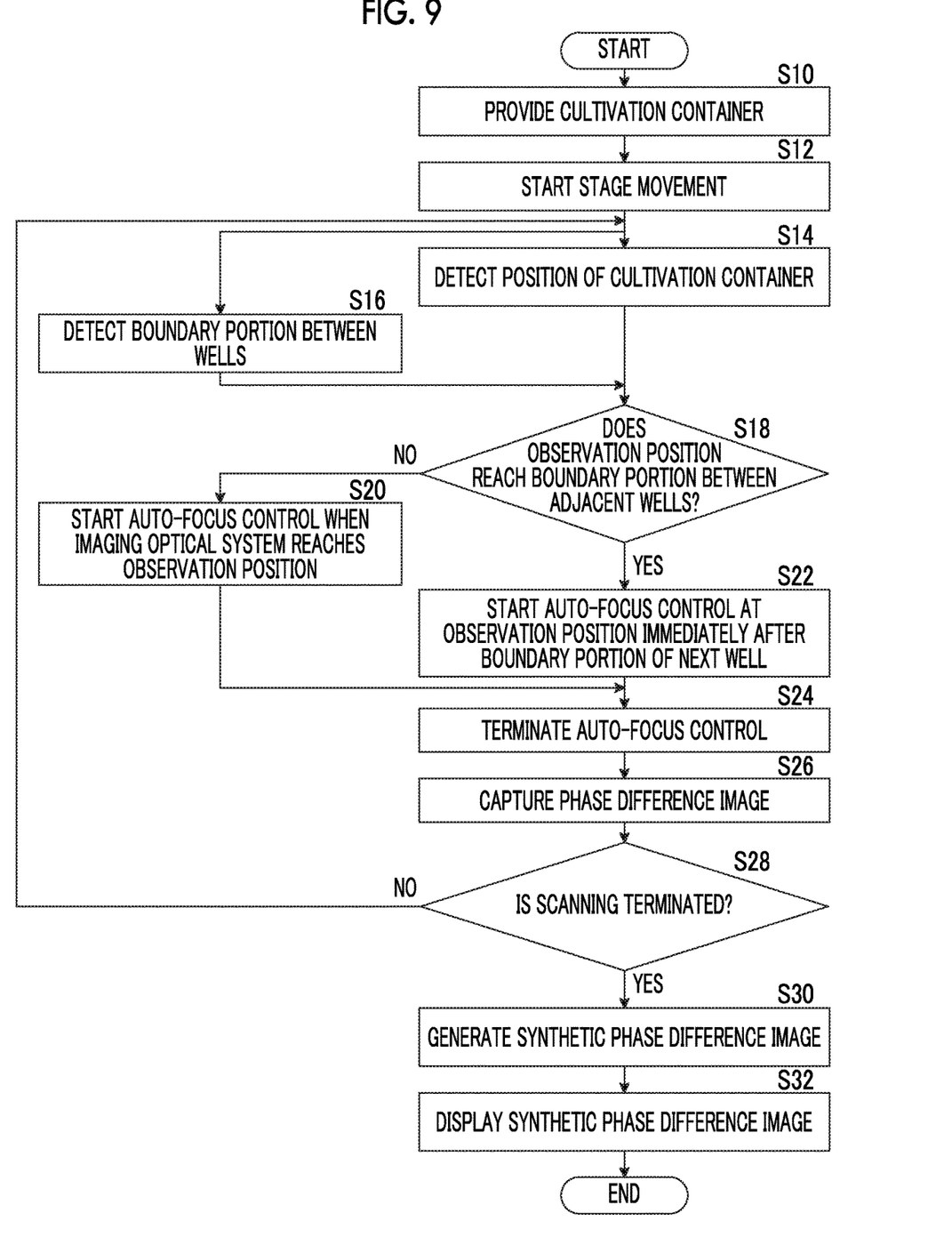
FIG. 9 is a flowchart illustrating an operation of the microscope observation system that uses the observation device according to the embodiment of the invention.

Next, an operation of the microscope observation system according to this embodiment will be described with reference to a flowchart shown in FIG. 9.

First, the cultivation container 50 in which cells that are observation targets are contained is provided on the stage 51 (S10).

Then, the stage 51 is moved so that the observation position of the imaging optical system 14 is set at the position of the scanning start point S shown in FIG. 8, and the movement of the stage 51 is started (S12).

Here, in this embodiment, as described above, the Z-directional position of the cultivation container 50 is precedently detected with respect to each observation position, and at a time point when the imaging optical system 14 is moved to the observation position, capturing of a phase difference image is performed. Further, the detection of the Z-directional position of the cultivation container 50 and the capturing of the phase difference image are performed while scanning the observation position, and capturing of a phase difference image at a certain observation position and detection of the Z-directional position of the cultivation container 50 at a forward position in the scanning direction with reference to the observation position are performed side by side.

Figure 10:
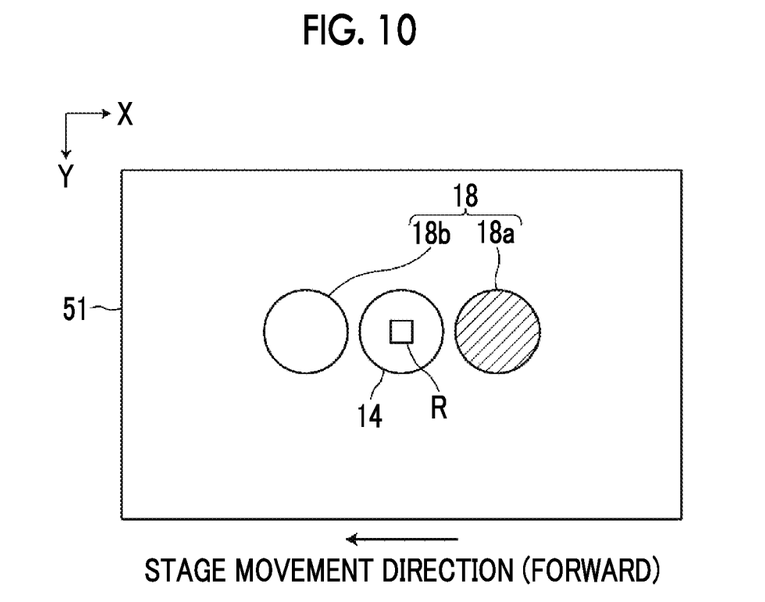
FIG. 10 is a schematic diagram illustrating an operation of the microscope observation system in a case where a stage is moved forward.

Specifically, in a case where the stage 51 is moved forward in an arrow direction shown in FIG. 10, the Z-directional position of the cultivation container 50 is detected by the first auto-focus displacement sensor 18a (S14), and information on the detected position is acquired by the auto-focus controller 21. The auto-focus controller 21 stores the acquired information on the Z-directional position of the cultivation container 50 together with X-Y coordinates of the observation position of the cultivation container 50.

Then, the first auto-focus displacement sensor 18a performs a process of detecting a boundary portion between wells, together with the detection of the Z-directional position of the cultivation container 50 at each observation position (S16). Further, in a case where the boundary portion between the wells is detected, the first auto-focus displacement sensor 18a stores the X-Y coordinates.

Then, the imaging optical system 14 is moved toward an observation position where the position detection of the cultivation container 50 is performed by the first auto-focus displacement sensor 18a in S14, and the auto-focus control at the observation position is performed, but at this time, a start timing for the auto-focus control is changed in accordance with observation positions, as described above.

Specifically, in a case where an observation position does not reach a boundary portion between adjacent wells (S18, NO), the auto-focus control is started when the imaging optical system 14 reaches each observation position (S20). Specifically, a movement amount in the Z direction of the objective lens 14b of the imaging optical system 14 is detected on the basis of the information on the Z-directional position of the cultivation container 50 at each observation position, and the auto-focus control is performed on the basis of the movement amount.

On the other hand, in a case where the imaging optical system 14 reaches an observation position just in front of the boundary portion between the adjacent wells, the auto-focus control at an observation position of the next well just behind the boundary portion (first observation position of the next well) is started from a time point when the auto-focus control at the observation position just in front of the boundary portion between the adjacent wells is terminated (S22). That is, the movement amount in the Z direction of the objective lens 14b of the imaging optical system 14 is detected on the basis of the information on the Z-directional position of the cultivation container 50 at the observation position just behind the boundary portion, and the auto-focus control is performed on the basis of the movement amount.

Further, after the auto-focus control is terminated with respect to each observation position (S24), a phase difference image is captured (S26). The phase difference image at each observation position is output from the imaging element 16 to the display controller 23 for storage.

Figure 11:
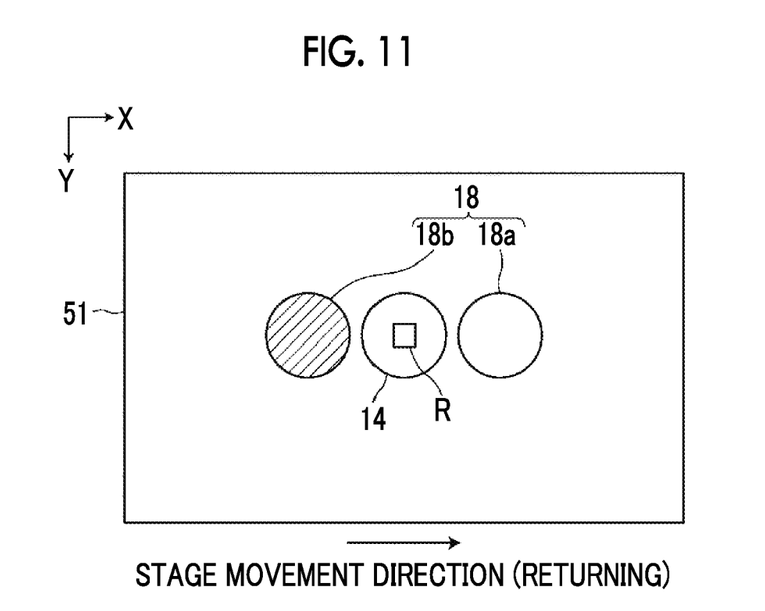
FIG. 11 is a schematic diagram illustrating an operation of the microscope observation system in a case where the stage is moved backward.

Further, in a case where the forward movement is terminated, and then, the movement is switched to a returning movement as shown in FIG. 11, a displacement sensor to be used is switched from the first auto-focus displacement sensor 18a to the second auto-focus displacement sensor 18b.

In addition, at this time point, in a case where the entire scanning is not terminated (S28, NO), the stage 51 is reversely moved, and the processes of S14 to S28 are performed.

The displacement sensor to be used is switched whenever the movement direction of the stage 51 is changed, and the processes of S14 to S26 are repeatedly performed until the entire scanning is terminated. Further, at a time point when the observation position reaches the position of the scanning end point E shown in FIG. 8, the entire scanning is terminated (S28, YES).

After the entire scanning is terminated, the display controller 23 combines phase difference images at the respective observation positions R to generate a synthetic phase difference image (S30), and displays the generated synthetic phase difference image on the display device 30 (S32).

According to the microscope observation system of this embodiment, since in performing the auto-focus control at respective observation positions in the cultivation container 50, a start timing of the auto-focus control at each observation position is set to be changed on the basis of the boundary portion D between the wells 52 that are adjacent to each other in a scanning direction of the observation positions, it is possible to efficiently perform the auto-focus control, and to shorten an imaging time.

Figure 12:
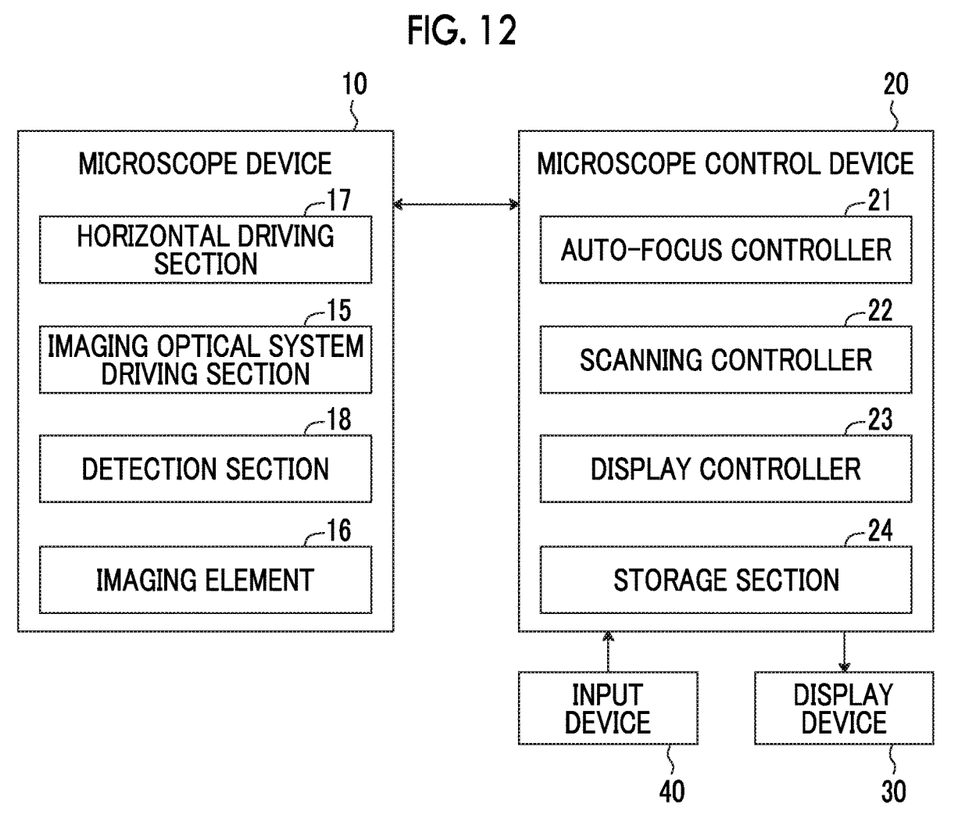
FIG. 12 is a block diagram showing a schematic configuration of a microscope observation system that uses an observation device according to another embodiment of the invention.

In the above-described embodiment, a configuration in which a boundary portion between wells is detected by the first or second auto-focus displacement sensor 18a or 18b is shown, but the invention is not limited thereto, and a configuration in which the boundary portion between the wells is acquired and is stored in advance may be used. Specifically, as shown in FIG. 12, a configuration in which a storage section 24 that stores information on a position of a boundary portion between wells is provided and the auto-focus controller 21 changes a start timing of the auto-focus control on the basis of the information on the position of the boundary portion stored in the storage section 24 may be used.

Further, in a case where the information on the position of the boundary portion between the wells is stored in this way, identification information may be assigned to each cultivation container 50, and a table in which the identification information and the information on the position of the boundary portion between the wells are associated with each other may be set in advance. By providing such a table, for example, even in a case where a cultivation container 50 having a different number of wells is provided, it is possible to appropriately change the start timing of the auto-focus control as described above. A user may set and input the identification information of the cultivation container 50 using the input device 40. Alternatively, a barcode or a radio frequency identification (RFID) tag in which identification information is stored is provided with respect to the cultivation container 50, and the identification information may be read out therefrom.

Further, in the microscope observation system of the embodiment, a configuration in which a boundary portion between wells is detected using the first or second auto-focus displacement sensors 18a and 18b is shown, but the invention is not limited thereto, and a configuration in which a sensor for well boundary detection instead of the first and second auto-focus displacement sensors 18a and 18b is provided may be used.

In addition, in the microscope observation system of the embodiment, a configuration in which a well plate including a plurality of wells 52 is used as the cultivation container 50 is shown, but a configuration in which a schale is used as the container of the invention and a plurality of schales are placed on the stage 51 may be used. In the embodiment, a start timing of the auto-focus control at each observation position is changed on the basis of a boundary portion between adjacent wells 52 that are adjacent to each other in a scanning direction of the observation positions, but in a case where the plurality of schales are placed on the stage 51, the start timing of the auto-focus control at each observation position may be changed on the basis of a boundary portion between schales that are adjacent to each other in the scanning direction of the observation positions.

Specifically, the above-described wells 52 may be replaced with schales, and the auto-focus control at an observation position just behind the boundary portion between the schales may be started from a time point when the auto-focus control at an observation position just in front of the boundary portion is terminated. Further, with respect to an observation position other than the observation position just behind the boundary portion, the auto-focus control may be started from a time point when the imaging optical system 14 reaches the observation position.

Figure 13:
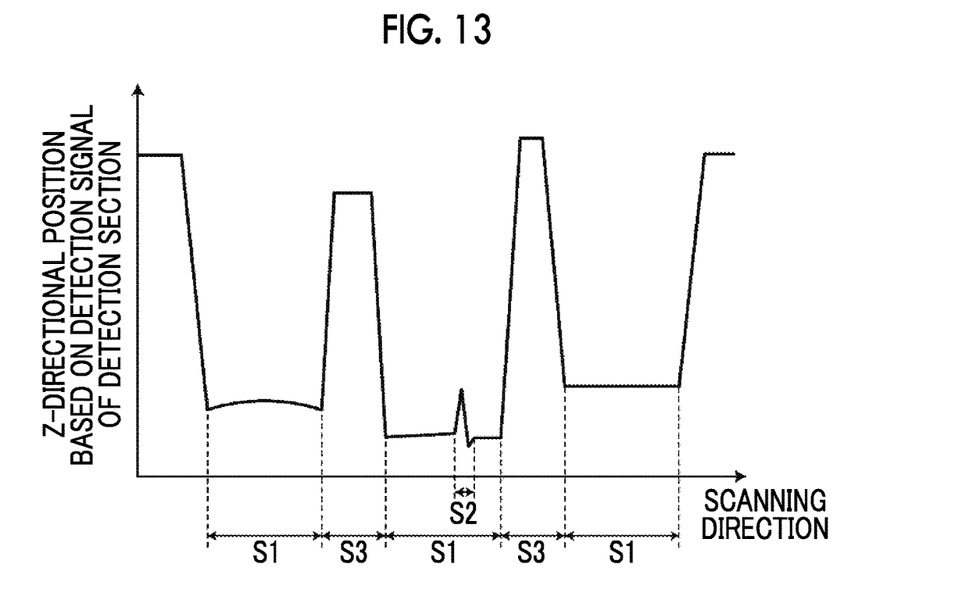
FIG. 13 is a diagram showing a Z-directional position based on a detection signal detected by a detection section in a case where there is a scar or the like on a bottom surface of a well.

Further, in the above-described embodiment, the Z-directional position of the bottom surface of the cultivation container 50 is detected, but for example, in a case where there is a scar or adhesion of dirt on a bottom surface of the cultivation container 50 and a detection signal detected by the detection section 18 is abnormal, it is not possible to perform an appropriate auto-focus control. FIG. 13 is a diagram showing a Z-directional position based on a detection signal detected by the detection section 18 in a case where there is a scar or adhesion of dirt on the bottom surface of the cultivation container 50, for example. A range S1 shown in FIG. 13 represents a range of a bottom surface of each well 52, and a range S3 represents a range of the boundary portion D between the wells 52. Further, a range S2 shown in FIG. 13 represents a range of a scar or adhesion of dirt on the bottom surface of the cultivation container 50. In this case, since a detection signal value in the range S2 or its distribution shape does not match a threshold value range or a distribution shape indicated by the bottom surface (S1) of the well 52 and the boundary portion (S3), it is determined that the corresponding detection signal is abnormal.

Thus, in a case where the detection signal detected by the detection section 18 is abnormal, with respect to an observation position at which the abnormal detection signal is detected, the auto-focus controller 21 may perform an auto-focus control based on detection signals of the detection section 18 at observation positions before and after the observation position in the scanning direction. In the case of the detection signal shown in FIG. 13, with respect to the range S2, the auto-focus control is performed using a detection signal at an observation position just in front of and/or just behind the range S2 instead of using the detection signal detected by the detection section 18.

Specifically, the auto-focus control at the observation position in the range S2 may be performed using an average value of the detection signal at the observation position just in front of the range S2 and the detection signal at the observation position just behind the range S2. Alternatively, instead of using the average value, the detection signal at the observation position just in front of the range S2 or the detection signal at the observation position just behind the range S2 may be used. Alternatively, linear interpolation may be performed using the detection signal at the observation position just in front of the range S2 and the detection signal at the observation position just behind the range S2 to obtain a detection signal at the observation position in the range S2. Further, the linear interpolation may be performed using detection signals at two or more observation positions before the range S2 and detection signals at two or more observation positions after the range S2, in addition to the observation positions just in front of and just behind the range S2, to thereby obtain a detection signal in the range S2.

In the above-described embodiment, a configuration in which observation positions in the cultivation container 50 are scanned by moving the stage 51 is shown, but the invention is not limited thereto, and a configuration in which an imaging system that includes the imaging optical system 14, the detection section 18, and the imaging element 16 is moved may be used. Further, a configuration in which both the stage 51 and the imaging system is moved may be used.

In the above-described embodiments, the invention is applied to a phase difference microscope, but the invention is not limited to the phase difference microscope, and may be applied to a different microscope such as a differential interference microscope or a bright field microscope.

In addition, in the above-described embodiments, a configuration in which a phase difference image formed by the imaging optical system 14 is captured by the imaging element 16 is shown, but a configuration in which an imaging element is not provided and an observation optical system or the like is provided so that a user is able to directly observe a phase difference image of an observation target formed by the imaging optical system 14 may be used.

EXPLANATION OF REFERENCES

10: microscope device
11: white light source
12: condenser lens
13: slit plate
14: imaging optical system
14a: phase difference lens
14b: objective lens
14c: phase plate
14d: imaging lens
15: imaging optical system driving section
16: imaging element
17: horizontal driving section
18: detection section
18a: first auto-focus displacement sensor
18b: second auto-focus displacement sensor
20: microscope control device
21: auto-focus controller
22: scanning controller
23: display controller
24: storage section
30: display device
40: input device
50: cultivation container
51: stage
51a: opening
52: well
52a: bottom portion
D: boundary portion
E: scanning end point
L: illumination light
M: solid line indicating scanning position
R: observation position
R1: observation position
R2: observation position
S: scanning start point

What is claimed is:

1. An observation device comprising:
a stage on which a plurality of containers in which an observation target is contained are placed;
an imaging optical system that includes an objective lens for forming an image of the observation target in each container;
a horizontal driving section that moves at least one of the stage or the imaging optical system in a horizontal plane;
a scanning controller that controls the horizontal driving section to move at least one of the stage or the imaging optical system, to scan an observation position in the stage;
an imaging optical system driving section that moves the objective lens in an optical axis direction; and
an auto-focus controller that controls the imaging optical system driving section to perform an auto-focus control at each observation position;
wherein the auto-focus controller changes a start timing of the auto-focus control at each observation position on the basis of a boundary portion between the containers that are adjacent to each other in a scanning direction of the observation positions.

2. The observation device according to claim 1, wherein the auto-focus controller starts the auto-focus control at an observation position just behind the boundary portion, after a time point when the auto-focus control at an observation position just in front of the boundary portion is terminated and before the imaging optical system reaches the observation position just behind the boundary portion.

3. The observation device according to claim 2, wherein the auto-focus controller starts the auto-focus control at a different observation position other than the observation position just behind the boundary portion, from a time point when the imaging optical system reaches the different observation position.

4. The observation device according to claim 3, wherein a period of time for the auto-focus control at the observation position just behind the boundary portion is longer than a period of time for the auto-focus control at the different observation position other than the observation position just behind the boundary portion.

5. The observation device according to claim 3, further comprising:
a detection section that precedently detects a vertical position of the container placed on the stage at the observation position before the imaging optical system reaches the observation position,
wherein the auto-focus controller performs the auto-focus control at the observation position on the basis of a detection signal of the detection section.

6. The observation device according to claim 2, wherein a period of time for the auto-focus control at the observation position just behind the boundary portion is longer than a period of time for the auto-focus control at the different observation position other than the observation position just behind the boundary portion.

7. The observation device according to claim 6, further comprising:
a detection section that precedently detects a vertical position of the container placed on the stage at the observation position before the imaging optical system reaches the observation position,
wherein the auto-focus controller performs the auto-focus control at the observation position on the basis of a detection signal of the detection section.

8. The observation device according to claim 2, further comprising:
a detection section that precedently detects a vertical position of the container placed on the stage at the observation position before the imaging optical system reaches the observation position,
wherein the auto-focus controller performs the auto-focus control at the observation position on the basis of a detection signal of the detection section.

9. The observation device according to claim 2, further comprising:
a storage section that stores positional information of the boundary portion between the respective containers,
wherein the auto-focus controller changes the start timing of the auto-focus control on the basis of the positional information of the boundary portion stored in the storage section.

10. The observation device according to claim 1, further comprising:
a detection section that precedently detects a vertical position of the container placed on the stage at the observation position before the imaging optical system reaches the observation position,
wherein the auto-focus controller performs the auto-focus control at the observation position on the basis of a detection signal of the detection section.

11. The observation device according to claim 10, wherein the detection section includes at least two displacement sensors that are disposed side by side in the scanning direction with the objective lens being interposed therebetween, and the displacement sensor to be used is changed in accordance with a direction change of the scanning direction.

12. The observation device according to claim 11, wherein the detection section detects the boundary portion between the containers.

13. The observation device according to claim 11, wherein in a case where the detection signal detected by the detection section is abnormal, the auto-focus controller performs the auto-focus control with respect to the observation position where the abnormal detection signal is detected, on the basis of detection signals of the detection section at observation positions before and after an observation position where the abnormal detection signal is detected in the scanning direction.

14. The observation device according to claim 10, wherein the detection section detects the boundary portion between the containers.

15. The observation device according to claim 14, wherein in a case where the detection signal detected by the detection section is abnormal, the auto-focus controller performs the auto-focus control with respect to the observation position where the abnormal detection signal is detected, on the basis of detection signals of the detection section at observation positions before and after an observation position where the abnormal detection signal is detected in the scanning direction.

16. The observation device according to claim 10, wherein in a case where the detection signal detected by the detection section is abnormal, the auto-focus controller performs the auto-focus control with respect to the observation position where the abnormal detection signal is detected, on the basis of detection signals of the detection section at observation positions before and after an observation position where the abnormal detection signal is detected in the scanning direction.

17. The observation device according to claim 1, further comprising:
a storage section that stores positional information of the boundary portion between the respective containers,
wherein the auto-focus controller changes the start timing of the auto-focus control on the basis of the positional information of the boundary portion stored in the storage section.

18. The observation device according to claim 1, wherein the container is each well of a well plate.

19. An observation method for moving at least one of a stage on which a plurality of containers in which an observation target is contained are placed or an imaging optical system that includes an objective lens for forming an image of the observation target in each container to scan an observation position in the stage to observe the observation target, the method comprising:
changing, in a case where the objective lens is moved in an optical axis direction to perform an auto-focus control at each observation position, a start timing of the auto-focus control at each observation position on the basis of a boundary portion between the containers that are adjacent to each other in a scanning direction of the observation positions.

20. A non-transitory computer recording medium storing an observation device control program that causes a computer to execute:
   a step of moving at least one of a stage on which a plurality of containers in which an observation target is contained are placed or an imaging optical system that includes an objective lens for forming an image of the observation target in each container to scan an observation position in the stage;
   a step of moving the objective lens in an optical axis direction to perform an auto-focus control at each observation position; and
   a step of changing a start timing of the auto-focus control at each observation position on the basis of a boundary portion between respective containers that are adjacent to each other in a scanning direction of the observation positions.

* * * * *